US012474842B2

(12) United States Patent
Sanguineti et al.

(10) Patent No.: US 12,474,842 B2
(45) Date of Patent: Nov. 18, 2025

(54) OPTIMIZING DATA PLACEMENT BASED ON DATA TEMPERATURE AND LIFETIME PREDICTION

(71) Applicant: Google LLC, Mountain View, CA (US)

(72) Inventors: Francisco Maturana Sanguineti, Mountain View, CA (US); Lluis Pamies-Juarez, Mountain View, CA (US); Mustafa Uysal, Mountain View, CA (US); Arif Abdulhusein Merchant, Los Altos, CA (US)

(73) Assignee: Google LLC, Mountain View, CA (US)

( * ) Notice: Subject to any disclaimer, the term of this patent is extended or adjusted under 35 U.S.C. 154(b) by 398 days.

(21) Appl. No.: 17/644,085

(22) Filed: Dec. 13, 2021

(65) Prior Publication Data

US 2023/0185457 A1    Jun. 15, 2023

(51) Int. Cl.
   *G06F 3/06* (2006.01)
   *G06N 5/04* (2023.01)
(52) U.S. Cl.
   CPC .......... *G06F 3/0616* (2013.01); *G06F 3/0655* (2013.01); *G06F 3/0659* (2013.01); *G06F 3/067* (2013.01); *G06F 3/0673* (2013.01); *G06N 5/04* (2013.01)
(58) Field of Classification Search
   CPC ....... G06N 5/04; G06F 3/0616; G06F 3/0655; G06F 3/0659; G06F 3/067; G06F 3/0673
   USPC ........................................................ 711/154
   See application file for complete search history.

(56) References Cited

U.S. PATENT DOCUMENTS

| 8,352,429 | B1 * | 1/2013 | Mamidi | G06F 16/2282 |
| | | | | 707/642 |
| 9,684,463 | B1 * | 6/2017 | Alshinnawi | G06F 3/0616 |
| 9,912,752 | B1 * | 3/2018 | Davis | G06F 16/2365 |
| 10,095,425 | B1 | 10/2018 | Martin | |
| 10,353,634 | B1 * | 7/2019 | Greenwood | G06F 3/0665 |
| 11,137,926 | B1 * | 10/2021 | Pendharkar | G06F 3/0611 |
| 11,320,986 | B2 * | 5/2022 | Ferreira | G06F 11/3419 |

(Continued)

OTHER PUBLICATIONS

International Search Report and Written Opinion relating to application PCT/US2022/081217, dated Apr. 13, 2023.

*Primary Examiner* — Reginald G Bragdon
*Assistant Examiner* — Aaron D Ho
(74) *Attorney, Agent, or Firm* — Honigman LLP; Brett A. Krueger

(57) ABSTRACT

A method for optimizing data storage includes obtaining a data object for storage at memory hardware in communication with data processing hardware. The memory hardware includes a plurality of storage devices, each storage device of the plurality of storage devices including storage parameters different from each other storage device of the plurality of storage devices. The method also includes determining one or more data object parameters associated with the data object and predicting, using a model and the data object parameters and the storage parameters, an object temperature representative of a frequency of access for the data object and an object lifetime representative of an amount of time the data object is to be stored. The method further includes selecting, using the predicted object temperature and object lifetime, one of the storage devices, and storing the data object at the selected one of the storage devices.

20 Claims, 6 Drawing Sheets

(56) References Cited

U.S. PATENT DOCUMENTS

| | | | |
|---|---|---|---|
| 2007/0239936 A1* | 10/2007 | Gluhovsky | G06F 12/0802 |
| | | | 711/E12.017 |
| 2012/0173831 A1 | 7/2012 | Rubio et al. | |
| 2014/0195542 A1* | 7/2014 | Larson | G06F 16/2228 |
| | | | 707/741 |
| 2014/0281158 A1 | 9/2014 | Ravimohan et al. | |
| 2015/0088940 A1* | 3/2015 | Stokely | G06F 16/184 |
| | | | 707/827 |
| 2016/0364176 A1* | 12/2016 | Sun | G06F 3/0619 |
| 2017/0285967 A1 | 10/2017 | Pandurangan et al. | |
| 2019/0205054 A1* | 7/2019 | Fujii | G06F 12/16 |
| 2019/0233902 A1* | 8/2019 | Luo | C12Q 1/6886 |
| 2020/0233598 A1* | 7/2020 | Bezugly | G06N 20/20 |
| 2020/0233612 A1* | 7/2020 | Dalmatov | G06F 3/0631 |
| 2020/0326871 A1* | 10/2020 | Wu | G06F 3/0647 |
| 2021/0064456 A1* | 3/2021 | Shetty | G06F 11/079 |
| 2021/0150379 A1* | 5/2021 | Wang | G06N 20/00 |
| 2021/0240372 A1 | 8/2021 | Loh et al. | |
| 2021/0241141 A1* | 8/2021 | Dugger | H04L 41/14 |
| 2022/0083245 A1* | 3/2022 | Kant | G06F 3/0632 |
| 2023/0161488 A1* | 5/2023 | Fan | G06F 3/0611 |
| | | | 711/165 |

* cited by examiner

OPTIMIZING DATA PLACEMENT BASED ON DATA TEMPERATURE AND LIFETIME PREDICTION

TECHNICAL FIELD

This disclosure relates to optimizing data placement based on data temperature and lifetime prediction.

BACKGROUND

As distributed storage (i.e., cloud storage) becomes increasingly popular for storing data records, optimizing the cost of storing records in a set of heterogeneous storage devices has become increasingly important. Large data storage devices may store large amounts of data records, but have limited access to the data records. Conversely, storage devices that store fewer data records allow frequent access. However, not all storage systems are optimal for storing data records. Storage devices with fine granularity deletion properties may allow any data object to be deleted regardless of the size and location of the data object. Conversely, storage devices with large granularity deletion properties may require that data objects be deleted in data blocks, data pages, or data containers, which may require multiple data objects to be entirely deleted or rewritten, thus requiring an additional garbage collection process. Determining an optimal storage device to store data records in a distributed storage system with heterogeneous Input/Output (IO) densities and deletion properties requires accurate predictions of the properties of the data records.

SUMMARY

One aspect of the disclosure provides a method of optimizing data placement based on data temperature and lifetime prediction. The method includes obtaining a data object for storage at memory hardware in communication with data processing hardware. The memory hardware includes a plurality of storage devices. Each storage device of the plurality of storage devices includes storage parameters different from each other storage device of the plurality of storage devices. The method also includes determining one or more data object parameters associated with the data object and predicting, using a model and the one or more data object parameters and the storage parameters, an object temperature of the data object and an object lifetime of the data object. The object temperature is representative of a frequency of access for the data object and the object lifetime is representative of an amount of time the data object is to be stored. The method further includes selecting, using the predicted object temperature of the data object and the predicted object lifetime of the data object, one of the storage devices of the plurality of storage devices, and storing the data object at the selected one of the storage devices. Implementations of the disclosure may include one or more of the following optional features. In some implementations, the storage parameters include at least one of a geographical location, a network connectivity, an input/output density, or data erasure characteristics. In some examples, the data object parameters include at least one of a data owner, an object name, an object size, a creation time, an object age or an object creation mechanism. In some implementations, predicting the object temperature and the object lifetime of the data object includes classifying the object using Bayesian Inference. In other implementations, predicting the object temperature and the object lifetime of the data object includes generating a prediction using a machine learning classification algorithm. Additionally or alternatively, predicting the object temperature and the object lifetime of the data object may include generating a prediction using a machine learning regression algorithm.

In some implementations, selecting the one of the storage devices of the plurality of storage devices includes performing a cost-benefit analysis. In these implementations, the cost-benefit analysis may include a per-byte cost of each storage device of the plurality of storage devices. In some examples, the method further includes, after storing the data object at the selected one of the storage devices, predicting, using updated data object parameters and the storage parameters, an updated object temperature of the data object and an updated object lifetime of the data object. These examples also include selecting, using the updated object temperature of the data object and the updated object lifetime of the data object, a second one of the storage devices of the plurality of storage devices. In some implementations, the method further includes, prior to predicting the object temperature of the data object and the object lifetime of the data object, training the model using historical temperature and lifetime training samples. In these implementations, the historical temperature and lifetime training samples may be biased using a Kaplan-Meier estimator.

Another aspect of the disclosure provides a system for optimizing data placement based on data temperature and lifetime prediction. The system includes data processing hardware and memory hardware in communication with the data processing hardware. The memory hardware includes a plurality of storage devices, each storage device of the plurality of storage devices including storage parameters different from each other storage device of the plurality of storage devices. The memory hardware stores instructions that when executed on the data processing hardware cause the data processing hardware to perform operations. The operations include obtaining a data object for storage at the memory hardware in communication with the data processing hardware. The operations also include determining one or more data object parameters associated with the data object and predicting, using a model and the one or more data object parameters and the storage parameters, an object temperature of the data object and an object lifetime of the data object. The object temperature is representative of a frequency of access for the data object and the object lifetime is representative of an amount of time the data object is to be stored. The operations further include selecting, using the predicted object temperature of the data object and the predicted object lifetime of the data object, one of the storage devices of the plurality of storage devices, and storing the data object at the selected one of the storage devices.

This aspect may include one or more of the following optional features. In some implementations, the storage parameters include at least one of a geographical location, a network connectivity, an input/output density, or data erasure characteristics. In some examples, the data object parameters include at least one of a data owner, an object name, an object size, a creation time, an object age or an object creation mechanism. In some implementations, predicting the object temperature and the object lifetime of the data object includes classifying the object using Bayesian Inference. In other implementations, predicting the object temperature and the object lifetime of the data object includes generating a prediction using a machine learning classification algorithm. Additionally or alternatively, predicting the object temperature and the object lifetime of the data object may include generating a prediction using a machine learning regression algorithm.

In some implementations, selecting the one of the storage devices of the plurality of storage devices includes performing a cost-benefit analysis. In these implementations, the cost-benefit analysis may include a per-byte cost of each storage device of the plurality of storage devices. In some examples, the operations further include, after storing the data object at the selected one of the storage devices, predicting, using updated data object parameters and the storage parameters, an updated object temperature of the data object and an updated object lifetime of the data object. These examples also include selecting, using the updated object temperature of the data object and the updated object lifetime of the data object, a second one of the storage devices of the plurality of storage devices. In some implementations, the operations further include, prior to predicting the object temperature of the data object and the object lifetime of the data object, training the model using historical temperature and lifetime training samples. In these implementations, the historical temperature and lifetime training samples may be biased using a Kaplan-Meier estimator.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

As distributed storage (i.e., cloud storage) becomes increasingly popular for storing data records, optimizing the cost of storing records has become increasingly important. In storage systems, the placement of data may be difficult to determine given a set of heterogeneous storage devices. Specifically, without information about the future properties of the data, finding an optimal storage device to store the data is challenging. While large data storage systems store large amounts of data records, these large data storage systems may allow less frequent access of the data. Conversely, storage devices that store fewer amounts of data records may allow frequent access. However, not all storage systems, which have varying densities, I/O capabilities, and cost, are optimal for storing data records. Determining an optimal device to store data records in a distributed storage system with heterogeneous IO densities and deletion properties requires accurate predictions of the future properties of the data records (e.g., access patterns and lifetime).

Implementations herein include a data placement optimizer that uses a predictive model to predict a data temperature and a lifetime of a data record and selects an optimal storage device based on the data temperature and the lifetime. The data temperature is representative of a frequency of access over time (e.g., reads and writes) for the data record while the lifetime represents how long the data record must persist until deletion. The optimal storage device may satisfy the storage requirements of a data record while minimizing incurred cost may be identified.

Figure 1:
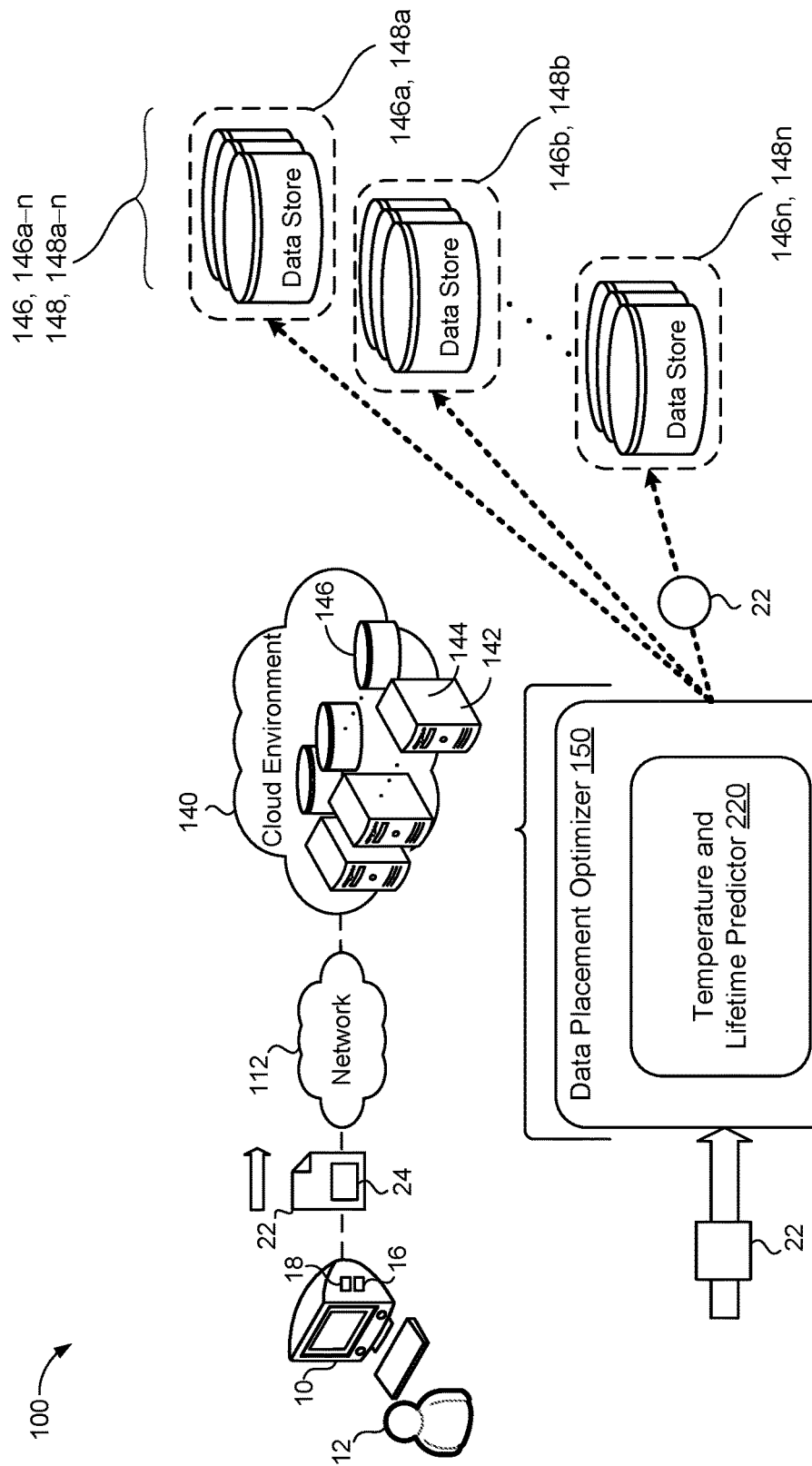
FIG. 1 is a schematic view of an example for optimizing the storage of data objects using a temperature and lifetime predictor model.

Referring to FIG. 1, in some implementations, an example system 100 includes a user device 10 associated with a respective user 12 in communication with a remote system 140 via a network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware).

The remote system 140 may be a single computer, multiple computers, or a distributed system (e.g., a cloud environment) having scalable/elastic computing resources 144 (e.g., data processing hardware) and/or storage resources 142 (e.g., memory hardware). Data stores 146, 146a-n (i.e., a remote storage device 146) may be overlain on the storage resources 142 to allow scalable use of the storage resources 142 by one or more of the client or computing resources 144. Each data store 146 of the data stores 146a is configured to store a plurality of data objects 22 within a data structure (e.g., a table) and has corresponding storage parameters 148, 148a-n different from each other data store 146. The data stores 146a, 146a-n can include any type of homogenous storage device such as, without limitation, a hard disk drive (HDD), a high performance solid state drive (SSD), a shingled magnetic recording HDD (SMR HDD) or a large capacity SSD. Each data store 146 146 may include any number of underlying homogenous storage devices. For example, a data store 146 may include hundreds or thousands of HDDs spread across remote system 140.

The storage parameters 148 of each data store 146 may be different from each other data store 146 and may include at least one of a geographical location, a network connectivity, an input/output (IO) density, access speeds, cache capabilities, data erasure characteristics, cost (e.g., cost per byte), etc. The geographical location indicates the physical location (e.g., a continent or region) of the data store 146. The network connectivity indicates a type or frequency with which the data store 146 is in communication with a network associated with the remote system 140. The IO density measures the performance delivered by a given amount of storage capacity of the data store 146. The data erasure characteristics include the granularity with which the data store 146 deletes data objects. For example, data stores 146 including storage parameters 148 with a fine granularity of data erasure allow any data object to be deleted regardless of the size and location of the data object. Conversely, data stores 146 including storage parameters 148 with a large granularity of data erasure may require that data objects are deleted in data blocks, data pages or data containers, which may require multiple data objects to be entirely deleted or rewritten, thus requiring an additional garbage collection process.

In some examples, a data store 146 includes one or more large SMR HDDs each with storage parameters 148 including a 20 tebibyte (TiB) capacity, and a low IO density. Additionally, a different data store 146 may include storage parameters 148 including one or more HDDs each with medium capacity of 12 TiB and a low IO density. Another different data store 146 may include storage parameters 148 including one or more HDDs each with small capacity of six (6) TiB and a medium IO density. A different data store 146 may include storage parameters 148 including one or more small SSDs and each with a high IO density, or one or more medium SSDs and each with a medium IO density.

The remote system 140 executes a data placement optimizer 150 implementing a temperature and lifetime predictor model 220 (also referred to as the model 220) and receives data objects 22 for storage at the data stores 146. The remote system 140 is configured to receive each data object 22 from the user device 10 via the network 112 and store the data object 22 at one of the data stores 146. Each data object 22 includes corresponding data object parameters 24 associated with the data object 22 which may include an identity of the user 12 (e.g., a data owner), an object name of the data object 22 (e.g., a file path), a size of the data object 22, a creation time of the data object 22, an object age of the data object 22, an originating program (e.g., a creation mechanism of the data object 22), a data type (e.g., photo, music, etc.), and an IO requirement. These examples are illustrative only and are not intended to limit the scope of the data object parameters 24. The data object parameters 24 may include any parameters that characterize the user 12, the user device 10, and or the data object 22, such as a usage or importance of the data object 22.

The data placement optimizer 150 receives the data object 22 (e.g., from the user device 10 and/or remote system 140), and, using the temperature and lifetime predictor model 220, predicts an object temperature 222 (FIGS. 2A and 2B) and an object lifetime 224 (FIGS. 2A and 2B) of the data object 22. That is, the temperature and lifetime predictor model 220 receives the data object 22 and the data object parameters 24, and, based on the data object 22 and respective data object parameters 24, generates the predicted object temperature 222 and the predicted object lifetime 224. As will be discussed in more detail below, the data placement optimizer 150 assigns the data object 22 to a data store 146, 146*a-n* based on the predicted object temperature 222 and/or the predicted object lifetime 224. In other words, the data placement optimizer 150 may store each received data object 22 at a data store 146 selected based on the predicted object temperature 222, the predicted object lifetime 224, and the storage parameters 148 of the data store 146.

Figure 2A:
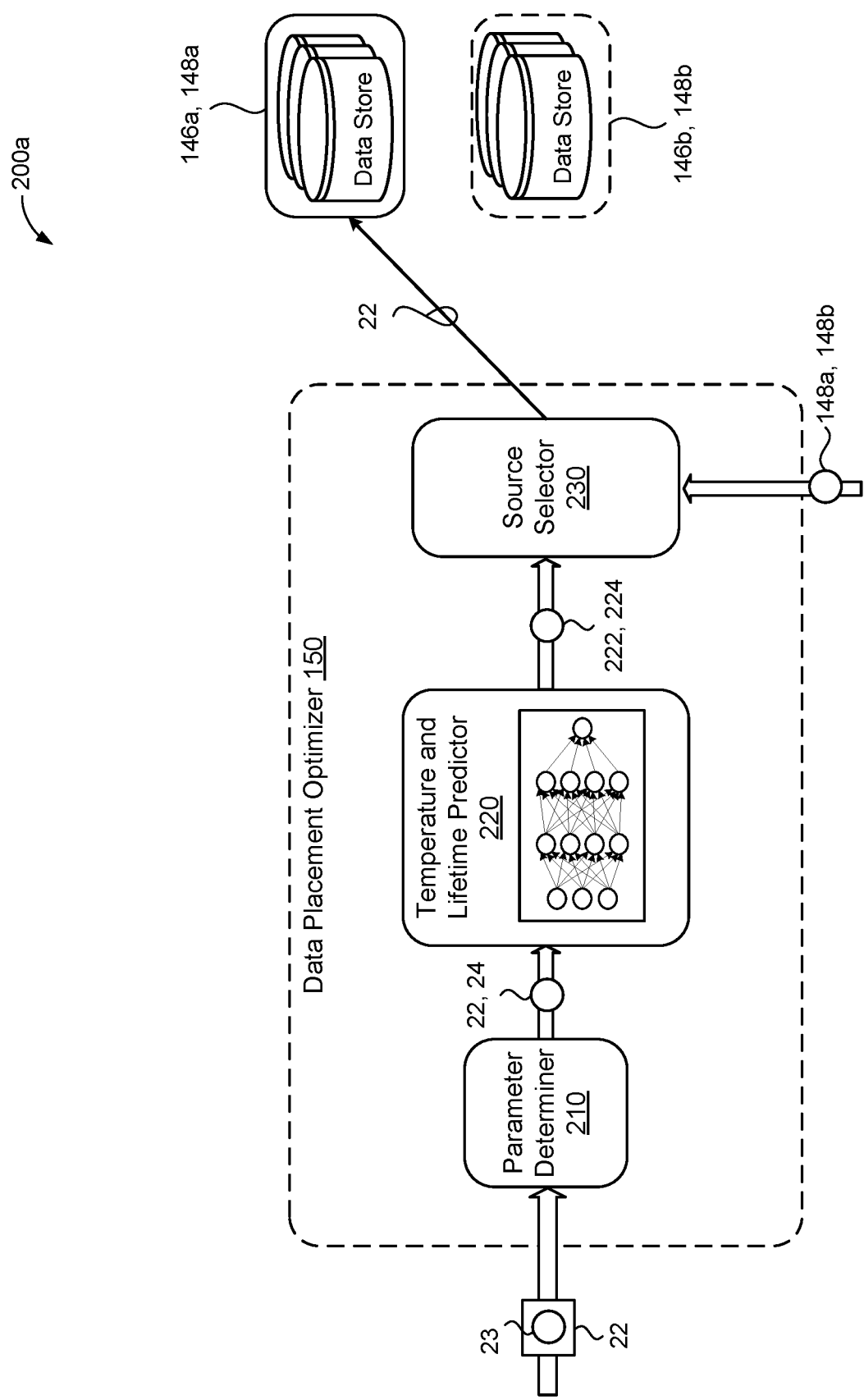
FIGS. 2A and 2B are schematic views of example components of the system of FIG. 1.
Figure 2B:
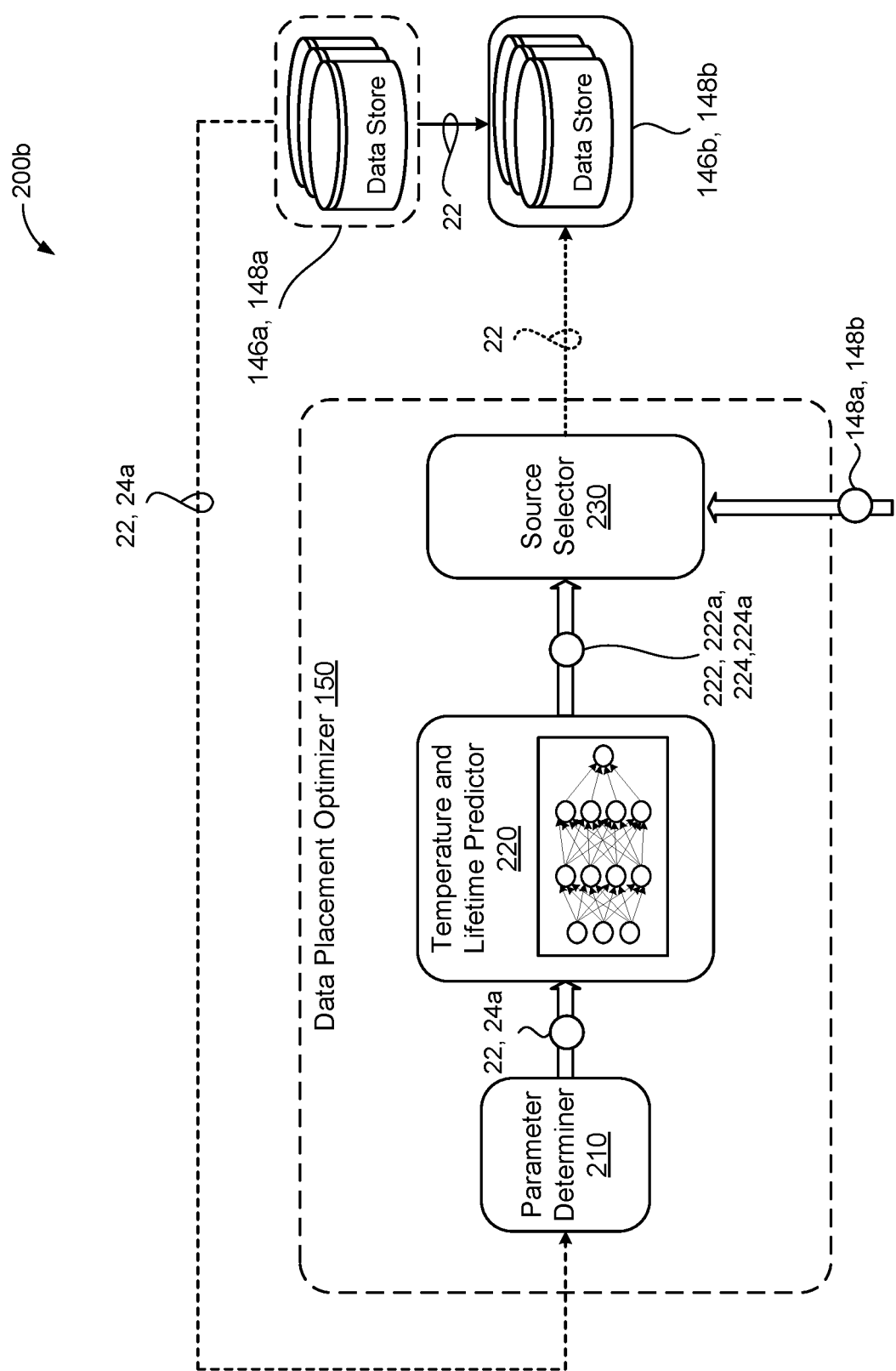

Referring now to FIGS. 2A and 2B, schematic views 200*a*, 200*b* exemplify optimizing data storage based on the predicted object temperature 222 and the predicted object lifetime 224. Because the temperature and lifetime for any given data object 22 is unknown when the data object 22 is first received for storage, identifying the optimal data store 146 for the data object 22 (i.e., selecting the data store with storage parameters 148 that satisfy the requirements of the data object 22 with minimal cost) over time is challenging. Not all data stores 146 are optimal for storing certain types of data objects 22. For example, storing a data object 22 that is rarely accessed in a high-performance (and relatively higher cost) SSD is non-optimal when lower cost HDDs are available. Performing predictions using the temperature and lifetime predictor model 220 allows the data placement optimizer 150 to select an optimal data store 146 for storing the data object 22 to minimize the costs of storage, IO, and garbage collection.

Here, the schematic view 200*a* includes the data placement optimizer 150 storing a data object 22 at an optimal data store 146 for the predicted object temperature 222 and predicted object lifetime 224 of the data object 22. In this example, the data placement optimizer 150 includes a parameter determiner 210, the temperature and lifetime predictor model 220, and a source selector 230. The parameter determiner 210 determines the data object parameters 24 of the data object 22. That is, the parameter determiner 210 receives the data object 22 and/or data object metadata 23 associated with the data object 22, and determines or extracts the data object parameters 24 associated with the data object 22.

The temperature and lifetime predictor model 220 is configured to receive the data object 22 and/or the associated data object parameters 24 output by the parameter determiner 210 and predict the object temperature 222 and the object lifetime 224 of the data object 22. The predicted object temperature 222 represents a frequency of access for the data object 22, and the predicted object lifetime 224 represents an amount of time the data object 22 is to be stored (i.e., before deletion or garbage collection). In other words, the model 220 uses the current data object parameters 24 to generate the predictions 222, 2224 access patterns for the data object 22 and how long the data object 22 will be stored before being deleted from the data store 146. In some examples, the temperature and lifetime predictor model 220 may predict the object temperature 222 and the object lifetime 224 independently (i.e., as two separate values or data structures) or as a single combined value/data structure. In some examples, the predicted object temperature 222 may vary over the predicted object lifetime 224 of the data object 22. For example, the temperature and lifetime predictor model 220 may predict that the data object 22 will be frequently accessed early in its lifetime and rarely accessed late in its lifetime.

In some implementations, the temperature and lifetime predictor model 220 generates the predictions 222, 224 by classifying the data object 22 using Bayesian Inference. In these implementations, the model 220 uses the cross product of the data object parameters 24 to generates a set of object parameter classes, and then uses Bayesian inference to predict the object lifetime 224 an the object temperature 222 based on, at least in part, how long the data object 22 has already been alive (i.e., existed).

In some examples, the temperature and lifetime predictor model 220 generates the predictions 222, 224 using a Machine Learning (ML) classification algorithm. In these examples, whether the data object 22 will be deleted within a given time frame is a binary classification, and whether the data object 22 will be accessed at a frequency in a given time frame is also a binary classification. The ML classification algorithm may use Random Forests and Boosted Trees (or any other algorithm such as regression analysis, K-nearest neighbors, decision trees, support vector machines, etc.) to classify the data objects 22 based on the binary classification of historical training samples and the data object parameters 24 of the data object 22. The temperature and lifetime predictor model 220 may additionally or alternatively generate the predictions 222, 224 using an ML regression algorithm. For instance, the model 220 may include neural networks with a single output neuron or the Random Survival Trees and Random Boosted Trees algorithm to predict the object temperature 222 and data lifetime 224 as a function of the data object 22 age. In some configurations, the model 220 utilizes more than one of the Bayesian inference, the ML classification, and the ML regression. For example, the data placement optimizer 150 averages or otherwise aggregates different predictions 222, 224 obtained via different algorithms.

The source selector 230 is configured to perform a cost-benefit analysis based on the predicted object temperature 222 of the data object 22, the predicted object lifetime 224 of the data object 22, and the storage parameters 148 of the available data stores 146. This cost-benefit analysis may further include a per-byte cost of each data store 146 of the plurality of data stores 146 (e.g., a cost of the data store 146 divided by a size of the data store 16). The source selector 230 selects the optimal data store 146 for storing the data object 22 based on which data store 146 includes storage parameters 148 that meet the requirements of the data object parameters 24 of the data object while minimizing the incurred cost of storing the data object 22 at the data store 146.

For example, the source selector 230 may consider one or more of the JO data object parameters 24 of the data object 22, the per-byte cost to store the data object 22 in any given data store 146, and the garbage collection cost, if any, of storing the data object 22 in a given data store 146. Using the predicted object temperature 222 of the data object 22 and the predicted object lifetime 224 of the data object, the source selector 230 may select data stores 146 that minimize the total cost of storing the data object 22 while still satisfying the requirements for the predicted object temperature 222 and the predicted object lifetime 224. For example, while the source selector 230 may seek to store the data object 22 at the cheapest per-byte cost data store 146, this data store 146 may have a low JO density. When the predicted object temperature 222 of the data object 22 is hot (i.e., a large quantity and/or high frequency of accesses are predicted), the data object 22 may be more optimally stored at a data store 146 with high JO density storage parameter 148 despite higher costs per byte. That is, a data store 146 with these storage parameters 148 may be associated with a higher per-byte cost but will meet the data object parameters 24 of the data object 22. Thus, the data placement optimizer 150, given storage parameters 148 (e.g., I/O densities and erasure properties) of data stores 146 and given the predicted object temperature 222 and predicted object lifetime 224 of the data object 22, selects a proper or optimal data store 146 to minimize an overall cost of storing the data object 22.

For example, the source selector 230 selects data stores 146 with a low IO density storage parameter 148 when the predicted object temperature 222 of the data object 22 is cold (e.g., will be accessed infrequently read). Conversely, the source selector 230 may select data stores 146 with a high IO density storage parameter 148 when the predicted object temperature 222 of the data object 22 is hot (e.g., will be frequently accessed). Similarly, the source selector 230 may select a data store 146 by considering data stores 146 with data erasure characteristic storage parameters 148 that are compatible with the predicted object lifetime 224 of the data object 22. For example, an HDD data store 146 may include storage parameters 148 of storing data objects 22 together in a container or single block unit. In these examples, the source selector 230 may evaluate whether a given data store 146 includes data objects 22 with similar object lifetime 224 predictions as the instant data object 22. Grouping data objects 22 with similar object lifetime 224 predictions minimizes the frequency of garbage collection and the cost of storing unused data objects 22 beyond their lifetime because the data objects 22 may generally be removed at the same time.

Still referring to FIG. 2A, the data placement optimizer 150 receives a data object 22 as an input to the parameter determiner 210. The parameter determiner 210 then determines the data object parameters 24 of the data object 22, and outputs the data object 22 and the data object parameters 24. In this example, the data object parameters 24 may include a high IO density requirement to allow the data object 22 to be frequently accessed and a geographical location. The data object 22 and the data object parameters 24 are then provided to the temperature and lifetime predictor model 220, which in turn generates a prediction of the object temperature 222 of the data object 22 and the object lifetime 224 of the data object 22. Once the temperature and lifetime predictor model 220 predicts the object temperature 222 and the object lifetime 224 of the data object 22, the object temperature 222 and the object lifetime 224 are output from the model 220. The source selector 230 receives the object temperature 222 and the object lifetime 224 predictions output by the model 220 and, together with the storage parameters 148, selects a data store 146 to store the data object 22.

In this example, the data store 146a includes storage parameters 148a representative of a high performance SSD and a high IO density. The data store 146b includes storage parameters 148b representative of a large capacity HDD and a medium IO density. While the data store 146a may include a higher per-byte storage cost, its IO density storage parameter 148 meets the data object parameter 24 of a high IO density requirement. Conversely, the data store 146b may have a lower per-byte storage cost, but its low IO density may not meet the data object parameter 24 of the high IO density requirement, and consequently the IO cost of the data store 146b may be higher than the IO cost of the data store 146a.

After the source selector 230 receives, as input, the object temperature 222 of the data object 22, the object lifetime 224 of the data object 22, and the storage parameters 148a, 148b of the available data stores 146a, 146b, the source selector 230 may perform the cost-benefit analysis to select a an optimal data store 146 to store the data object 22. The source selector 230 then selects, based on the cost-benefit analysis, the data store 146a for storing the data object. In response, the data object 22 is stored at the data store 146a. The source selector 230 may weight different storage parameters 148 based on the data object 22 when selecting the optimal data store 146. For example, when a data object 22 requires high IO density, IO density storage parameters 148 may have an increased weight.

Referring now to FIG. 2B, the schematic view 200b illustrates the data placement optimizer 150 moving and storing the data object 22 at an optimal data store 146 for the temperature and lifetime of the data object 22 based on updated data object parameters 24a of the data object 22. In this example, after the data object 22 has been stored at the data store 146a for a threshold period of time (i.e., the data placement optimizer previously evaluated the data object 22 and stored the data object 22 at the data store 146a), the data placement optimizer 150 again reviews the data object 22 and the updated data object parameters 24a. The updated data object parameters 24a may include, in addition to the data object parameters 24, actual data temperature and data lifetime of the data object 22 during the threshold period of time (i.e., frequency of access patterns of the data object 22 over the time that the data object 22 was stored at the data store 146a).

The parameter determiner 210 receives the data object 22 as an input, and produces the updated data object parameters 24a associated with the data object 22 as an output. The data object 22 and the updated data object parameters 24a are provided as input to the temperature and lifetime predictor model 220, which generates an updated predicted object temperature 222, 222a and an updated predicted object lifetime 224, 224a. In other words, the model 220 receives the updated data object parameters 24 and predicts, using the updated data object parameters 24a, the updated object temperature 222a of the data object 22 and the updated object lifetime 224a of the data object 22. The model 220 provides the updated predictions 222a, 224a to the source selector 230. The source selector 230 selects, based on the updated object temperature 222a, the updated object lifetime 224a, and the storage parameters 148a, 148b of the data stores 146a, 146b, an updated data store 146 for storing the data object 22.

In this example, the updated data object parameters 24a indicate that the data object 22 has been accessed less frequently than was predicted in the original predicted object temperature 222. Accordingly, the cost of storing the data object 22 may be safely decreased by moving the data object 22 to a lower IO density data store 146. Because the data store 146b includes storage parameters 148b of a medium IO density, the source selector 230, in this example, selects the data store 146b to store the data object 22. In some examples, the cost-benefit analysis of the source selector 230 includes the cost to delete and transfer the data object 22 from the data store 146a to the data store 146b. As shown in FIG. 3B, once the source selector 230 selects the data store 146b, the data object 22 is moved from the data store 146a to the data store 146b.

Figure 3:
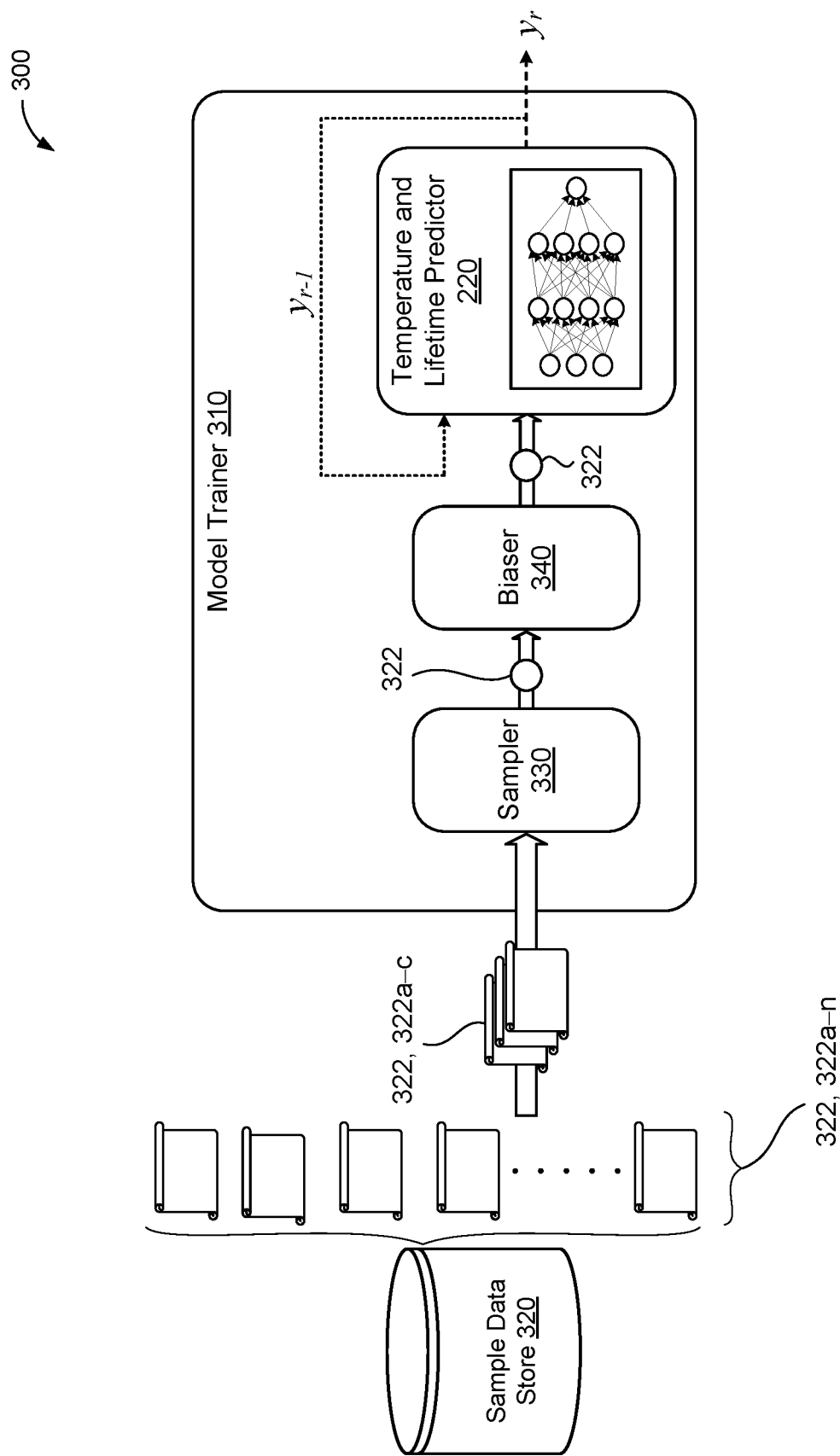
FIG. 3 is a schematic view of an example training process for promoting a temperature and lifetime predictor model to learn consistent predictions on data objects.

FIG. 3 shows an example of a training process 300 for training the model 220 to predict the object temperature 222 and the object lifetime 224 of the data object 22. The training process 300 includes a model trainer 310 that obtains a plurality of historical temperature and lifetime training samples 322, 322a-n (also referred to herein as training samples 322) stored in a sample data store 320. The model trainer 310 trains the model 220 using the historical temperature and lifetime training samples 322. The sample data store 130 may reside on the memory hardware 142 of the remote system 140. As discussed above with respect to FIGS. 2A and 2B, the temperature and lifetime for any given data object 22 is unknown when the data object 22 is first received for storage, which makes identifying the optimal data store 146 challenging. Training the model 220 using historical temperature and lifetime training samples 322 allow the model 220 to predict an object temperature 222 and an object lifetime 224 of a data object 22 when it is received for storage at the data store 146.

The model trainer 310 may also include a sampler 330 and a biaser 340. The sampler 330 samples historical temperature and lifetime training samples 322 from the sample data store 320 and provides the historical temperature and lifetime training samples 322 to the biaser 340. In other words, the sampler 330 may sample, from the sample data store 320, historical temperature and lifetime training samples 322 from a plurality of historical temperature and lifetime training samples 322 stored in the sample data store 320. The biaser 340 receives the historical temperature and lifetime training samples 322 as input from the sampler 330 and biases the training samples 322 to generate unbiased training samples 322 to train the temperature and lifetime predictor model 220.

In some implementations, the distribution of the training samples 322 is naturally biased to include younger training samples 322 at a higher frequency than older training samples 322. That is, a higher rate of deletions of the older training samples 322 may occur due to the passage of time (i.e., because older data is naturally more likely to have been deleted already). The biaser 340 may use a Kaplan-Meier estimator with right censoring and left truncation to shift the distribution of training samples 322, thereby unbiasing the training samples 322. In some examples, the biaser 340 includes a resampling of the plurality of training samples 322 in the sample data store 320 by downsampling for additional older training samples 322.

In the example shown, the historical temperature and lifetime training samples 322a-c are sampled by the sampler 330 to train the model 220. The biaser 340 receives the training samples 322 and biases the training samples 322 to unbias the training samples 322. The temperature and lifetime predictor model 220 then receives the unbiased training samples 322 as input and generates an output prediction $y_r$ which is tested for its accuracy. At each time-step during the training process 300, the temperature and lifetime predictor model 220 is additionally trained using the output prediction for the previous time-step $y_{r-1}$.

Figure 4:
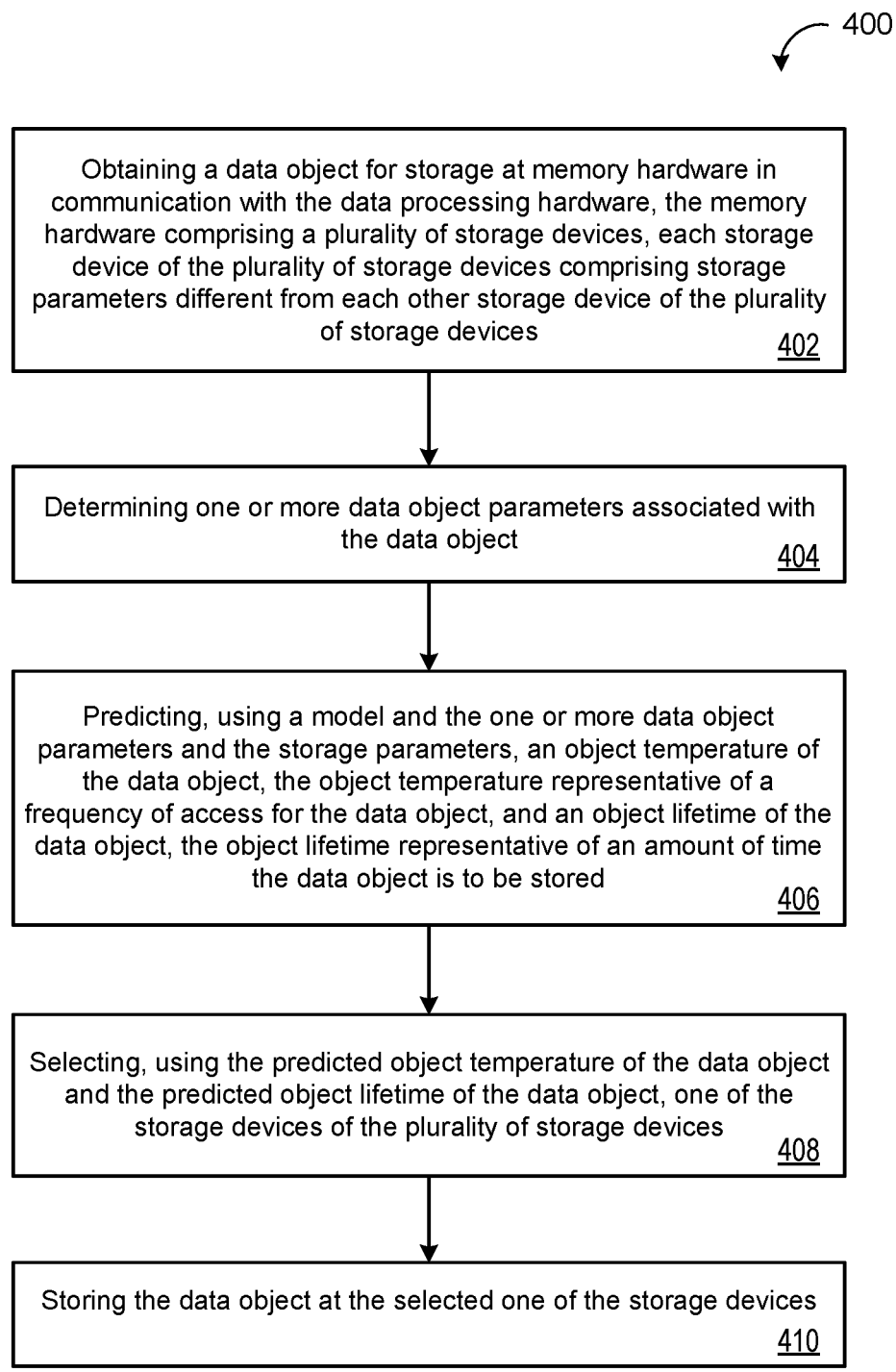
FIG. 4 is a flowchart of an example arrangement of operations for a method of implementing the temperature and lifetime predictor model for storing data objects.

FIG. 4 is a flowchart of an exemplary arrangement of operations for a method 400 of optimizing data storage based on data temperature and lifetime prediction. The method 400 includes, at operation 402, obtaining a data object 22 for storage at memory hardware 142 in communication with the data processing hardware 144. The memory hardware 142 includes a plurality of data stores 146, 146a-n, each data store 146 of the plurality of data stores 146 including storage parameters 148 different from each other data store 146 of the plurality of data stores 146. At operation 404, the method 400 includes determining one or more data object parameters 24 associated with the data object 22.

At operation 406, the method 400 includes predicting, using a model 220 and the one or more data object parameters 24 and the storage parameters 148, an object temperature 222 of the data object 22 and an object lifetime 224 of the data object 22. The object temperature 222 representative of a frequency of access for the data object 22, and the object lifetime 224 representative of an amount of time the data object 22 is to be stored. The method 400 further includes, at operation 408, selecting, using the predicted object temperature 222 and the predicted object lifetime 224 of the data object 22, one of the data stores 146 of the plurality of data stores 146. At operation 410, the method 400 includes storing the data object 22 at the selected one of the data stores 146.

Figure 5:
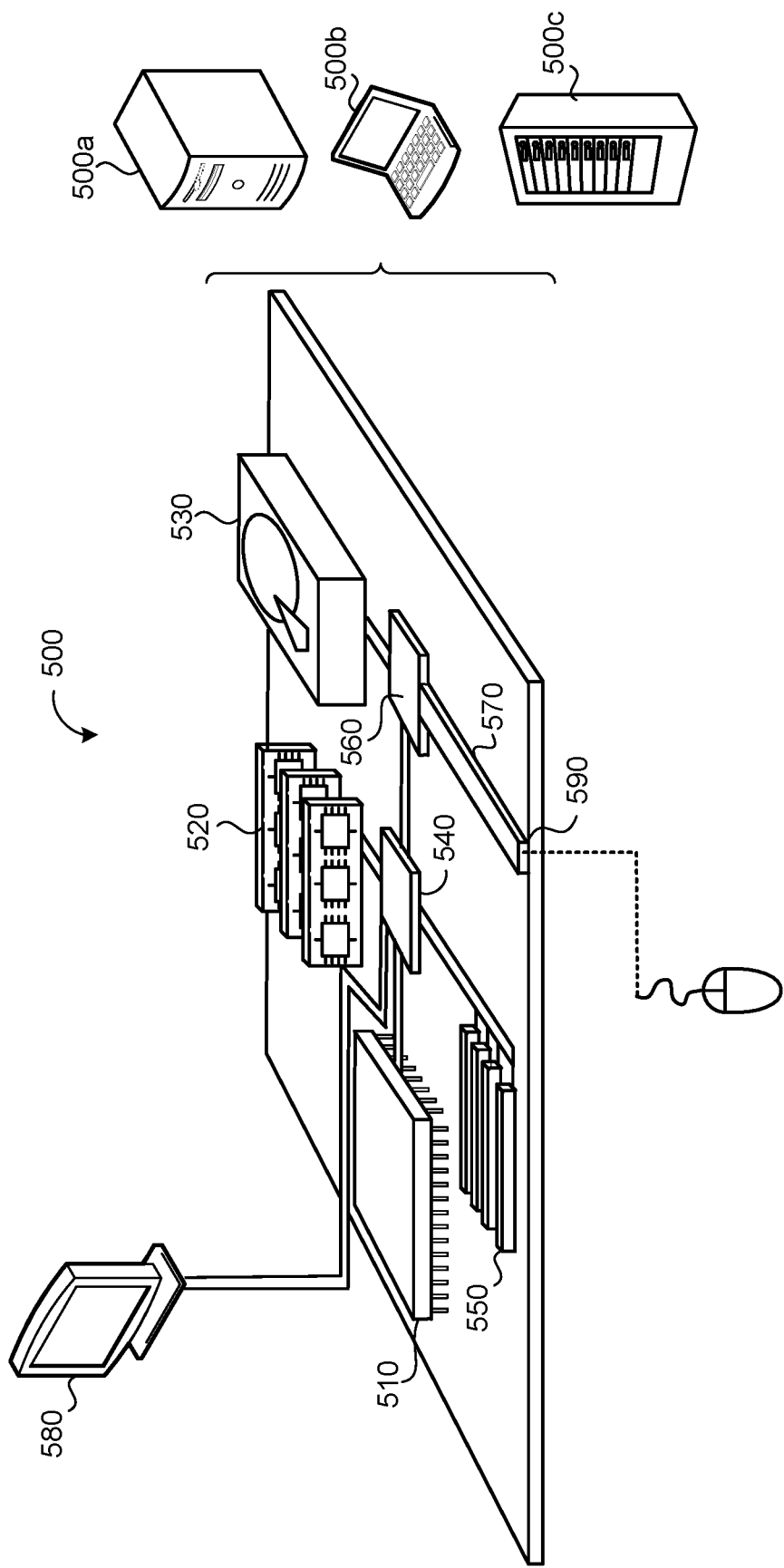
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware that causes the data processing hardware to perform operations comprising:
   obtaining a data object for storage at memory hardware in communication with the data processing hardware, the memory hardware comprising a plurality of storage devices, each storage device of the plurality of storage devices comprising storage parameters different from each other storage device of the plurality of storage devices;
   prior to storing the data object at the memory hardware:
      determining one or more data object parameters associated with the data object;
      predicting, using a model, based on the one or more data object parameters and the storage parameters of the plurality of storage devices:
         an object temperature of the data object, the object temperature representative of a frequency of access for the data object; and
         an object lifetime of the data object, the object lifetime representative of an amount of time the data object is to be stored; and
      selecting, based on the predicted object temperature of the data object, the predicted object lifetime of the data object, and the storage parameters of the plurality of storage devices, one of the storage devices of the plurality of storage devices; and
   storing the data object at the selected one of the storage devices.

2. The method of claim 1, wherein the storage parameters comprise at least one of:
   a geographical location;
   network connectivity;
   input/output density; or
   data erasure characteristics.

3. The method of claim 1, wherein the data object parameters comprise at least one of:
   a data owner;
   an object name;
   an object size;
   a creation time;
   an object age; or
   an object creation mechanism.

4. The method of claim 1, wherein predicting the object temperature and the object lifetime of the data object comprises classifying the data object using Bayesian Inference.

5. The method of claim 1, wherein predicting the object temperature and the object lifetime of the data object comprises generating a prediction using one of a machine learning classification algorithm or a machine learning regression algorithm.

6. The method of claim 1, wherein selecting the one of the storage devices of the plurality of storage devices comprises performing a cost-benefit analysis.

7. The method of claim 6, wherein the cost-benefit analysis comprises a per-byte cost of each storage device of the plurality of storage devices.

8. The method of claim 1, wherein the operations further comprise, after storing the data object at the selected one of the storage devices:
   predicting, using updated data object parameters and the storage parameters:
      an updated object temperature of the data object; and
      an updated object lifetime of the data object; and
   selecting, using the updated object temperature of the data object and the updated object lifetime of the data object, a second one of the storage devices of the plurality of storage devices.

9. The method of claim 1, where the operations further comprise, prior to predicting the object temperature of the data object and the object lifetime of the data object, training the model using historical temperature and lifetime training samples.

10. The method of claim 9, wherein the historical temperature and lifetime training samples are biased using a Kaplan-Meier estimator.

11. A system comprising:
    data processing hardware; and
    memory hardware comprising a plurality of storage devices, each storage device of the plurality of storage devices comprising storage parameters different from each other storage device of the plurality of storage devices, the memory hardware in communication with the data processing hardware and storing instructions that, when executed on the data processing hardware, cause the data processing hardware to perform operations comprising:
       obtaining a data object for storage at the memory hardware;
       prior to storing the data object at the memory hardware:
          determining one or more data object parameters associated with the data object;
          predicting, using a model, based on the one or more data object parameters and the storage parameters of the plurality of storage devices:
             an object temperature of the data object, the object temperature representative of a frequency of access for the data object; and
             an object lifetime of the data object, the object lifetime representative of an amount of time the data object is to be stored; and
          selecting, based on the predicted object temperature of the data object, the predicted object lifetime of the data object, and the storage parameters of the plurality of storage devices, one of the storage devices of the plurality of storage devices; and storing the data object at the selected one of the storage devices.

12. The system of claim 11, wherein the storage parameters comprises at least one of:
   a geographical location;
   network connectivity;
   input/output density; or
   data erasure characteristics.

13. The system of claim 11, wherein the data object parameters comprise at least one of:
   a data owner;
   an object name;
   an object size;
   a creation time;
   an object age; or
   an object creation mechanism.

14. The system of claim 11, wherein predicting the object temperature and the object lifetime of the data object comprises classifying the data object using Bayesian Inference.

15. The system of claim 11, wherein predicting the object temperature and the object lifetime of the data object comprises generating a prediction using one of a machine learning classification algorithm or a machine learning regression algorithm.

16. The system of claim 11, wherein selecting the one of the storage devices of the plurality of storage devices comprises performing a cost-benefit analysis.

17. The system of claim 16, wherein the cost-benefit analysis comprises a per-byte cost of each storage device of the plurality of storage devices.

18. The system of claim 11, wherein the operations further comprise, after storing the data object at the selected one of the storage devices:
   predicting, using updated data object parameters and the storage parameters:
      an updated object temperature of the data object; and
      an updated object lifetime of the data object; and
   selecting, using the updated object temperature of the data object and the updated object lifetime of the data object, a second one of the storage devices of the plurality of storage devices.

19. The system of claim 11, where the operations further comprise, prior to predicting the object temperature of the data object and the object lifetime of the data object, training the model using historical temperature and lifetime training samples.

20. The system of claim 19, wherein the historical temperature and lifetime training samples are biased using a Kaplan-Meier estimator.

* * * * *